United States Patent
Hussein et al.

(10) Patent No.: US 11,277,396 B2
(45) Date of Patent: Mar. 15, 2022

(54) METHOD FOR AUTHORIZATION MANAGEMENT IN A COMMUNITY OF CONNECTED OBJECTS

(71) Applicant: ORANGE, Paris (FR)

(72) Inventors: Dina Hussein, Chatillon (FR); Emmanuel Bertin, Chatillon (FR)

(73) Assignee: ORANGE, Paris (FR)

( * ) Notice: Subject to any disclaimer, the term of this patent is extended or adjusted under 35 U.S.C. 154(b) by 254 days.

(21) Appl. No.: 16/345,795

(22) PCT Filed: Nov. 9, 2017

(86) PCT No.: PCT/FR2017/053063
§ 371 (c)(1),
(2) Date: Apr. 29, 2019

(87) PCT Pub. No.: WO2018/087483
PCT Pub. Date: May 17, 2018

(65) Prior Publication Data
US 2019/0268328 A1    Aug. 29, 2019

(30) Foreign Application Priority Data
Nov. 10, 2016 (FR) ...................................... 1660889

(51) Int. Cl.
*H04L 29/06* (2006.01)
*H04W 4/70* (2018.01)
*H04L 67/12* (2022.01)

(52) U.S. Cl.
CPC ........ *H04L 63/0807* (2013.01); *H04L 63/104* (2013.01); *H04L 67/12* (2013.01); *H04W 4/70* (2018.02)

(58) Field of Classification Search
CPC ... H04L 63/0807; H04L 63/104; H04L 67/12; H04W 4/70
See application file for complete search history.

(56) References Cited

U.S. PATENT DOCUMENTS

| 2015/0121470 A1* | 4/2015 | Rongo ................ H04L 12/2807 726/4 |
| 2015/0143471 A1 | 5/2015 | Kim et al. |

(Continued)

FOREIGN PATENT DOCUMENTS

EP    2890073 A1    1/2015

OTHER PUBLICATIONS

International Search Report for the International Application No. PCT/FR2017/053063.

*Primary Examiner* — Brandon S Hoffman
*Assistant Examiner* — William A Corum, Jr.
(74) *Attorney, Agent, or Firm* — Haverstock & Owens, A Law Corporation

(57) ABSTRACT

The present invention relates to a method for authorization management in a community (106) of connected objects (103, 104, 105), a master object being determined in said community, the method comprising:
receipt, by the master object (102), of a request (110, 123, 130) to carry out an action concerning:
the community (106) of connected objects (103, 104, 105) or
an internal object of the community (106), the internal object being distinct from the master object (102);
receipt (119, 124, 137) of a list of attributes (101), by an authentication server (107) that is distinct from the master object (102);
after the list of attributes is verified by the authentication server (107) and a capability of the requesting object (101) is determined based on said list of attributes, receipt (201, 211, 221) by the master object (102) of an authentication token comprising said capability;
transfer (202, 212, 222) of said authentication token to said requesting object (101).

13 Claims, 6 Drawing Sheets

(56) References Cited

U.S. PATENT DOCUMENTS

Figure 1B:
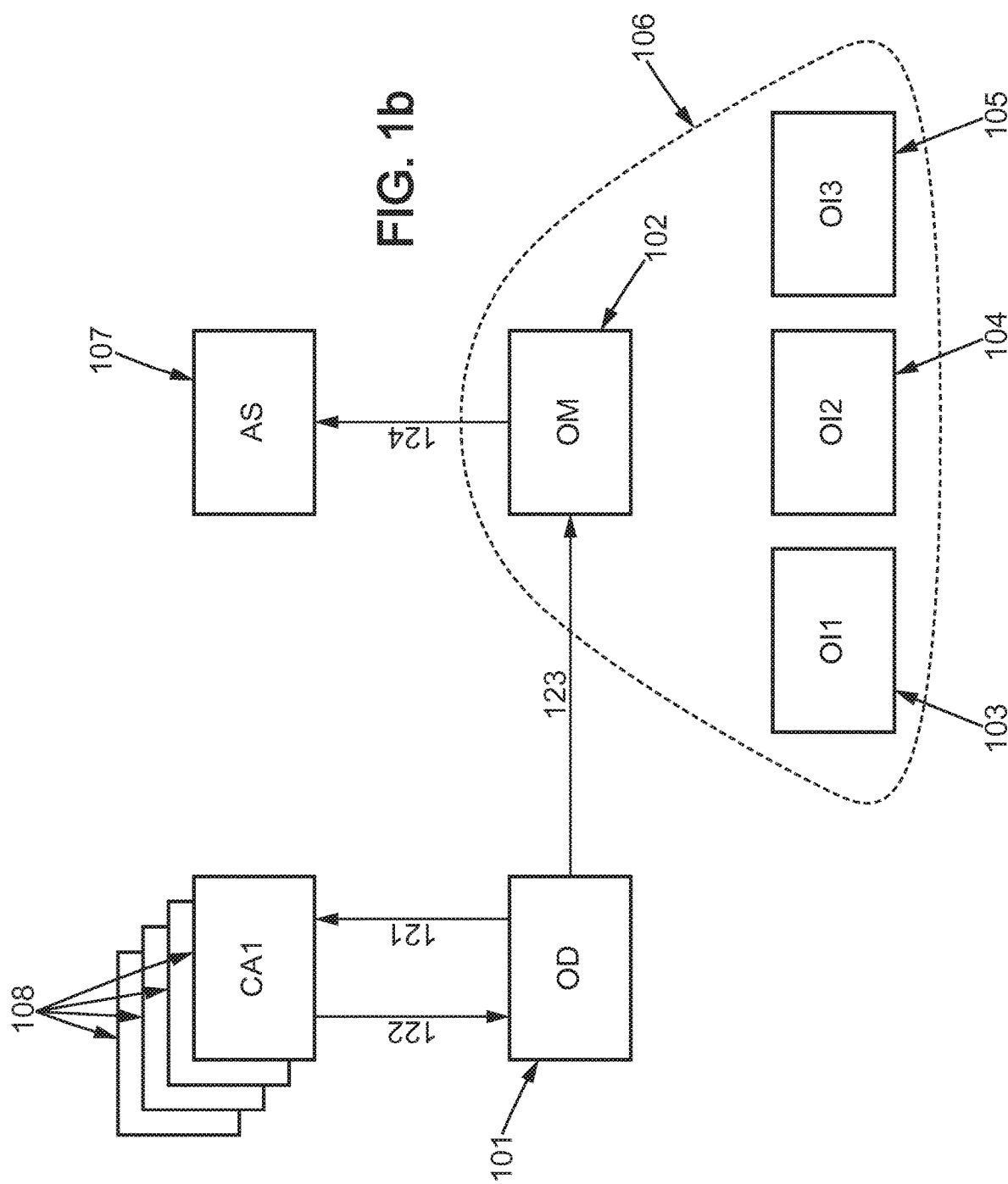

| | | | |
|---|---|---|---|
| 2016/0036819 A1* | 2/2016 | Zehavi | H04W 4/70 |
| | | | 726/4 |
| 2016/0041534 A1* | 2/2016 | Gupta | H04L 12/2816 |
| | | | 700/275 |
| 2016/0044719 A1 | 2/2016 | Sidhu et al. | |
| 2017/0195318 A1* | 7/2017 | Liu | H04L 67/2809 |
| 2017/0279620 A1* | 9/2017 | Kravitz | H04L 9/3268 |
| 2018/0176079 A1* | 6/2018 | Teo | H04W 76/15 |
| 2019/0132726 A1* | 5/2019 | Song | H04W 12/06 |
| 2019/0200405 A1* | 6/2019 | Gupta | H04W 76/11 |

\* cited by examiner

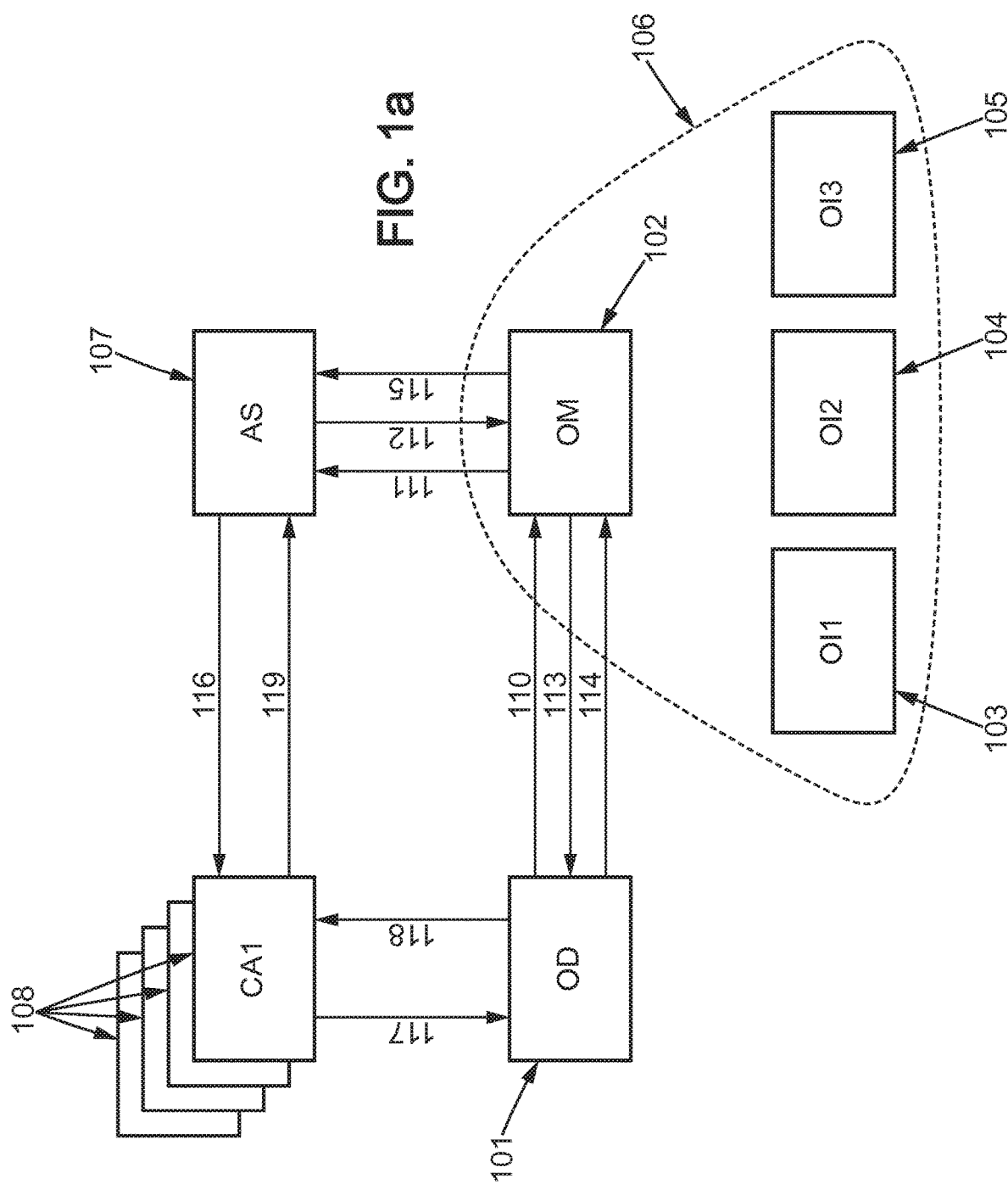

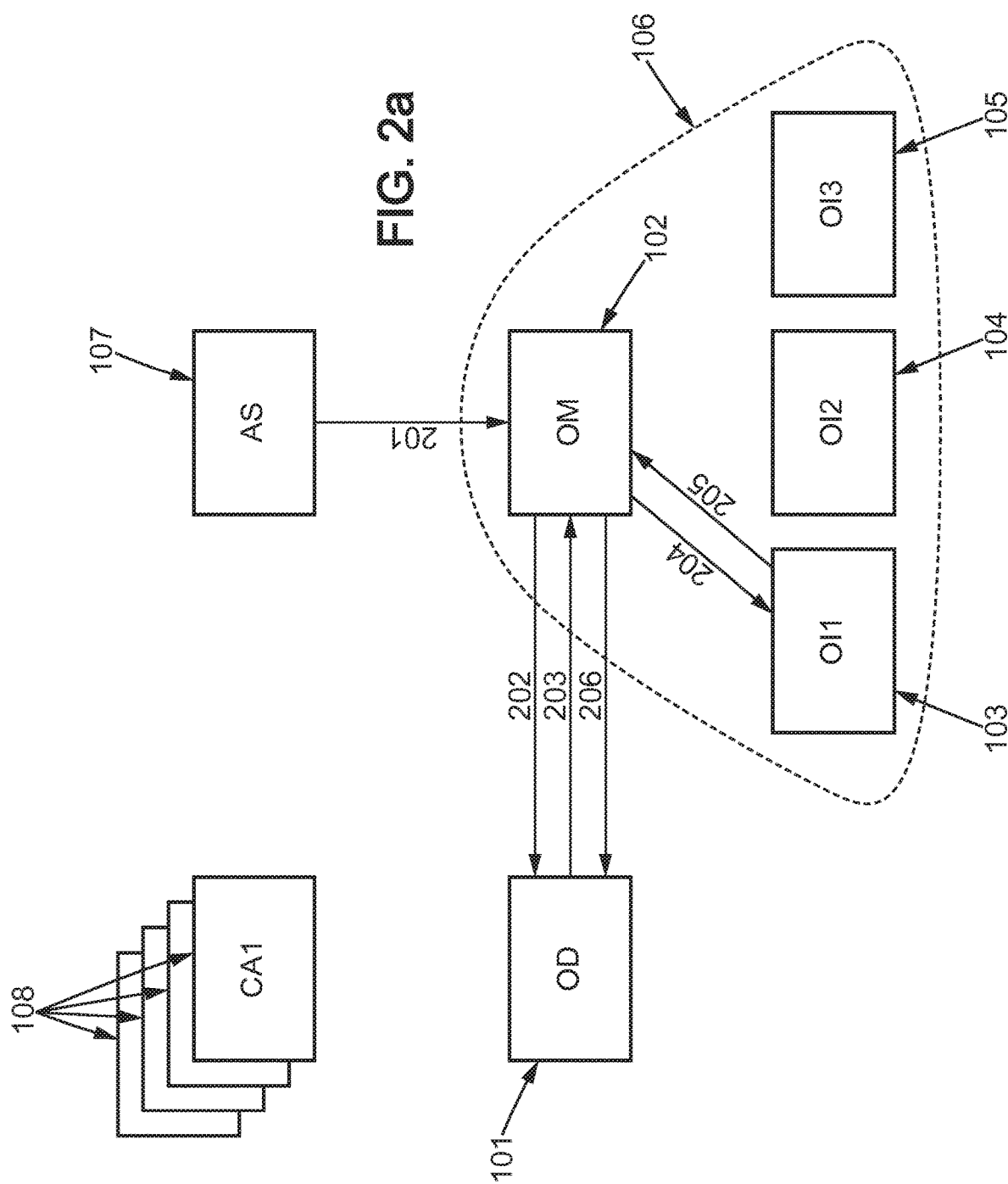

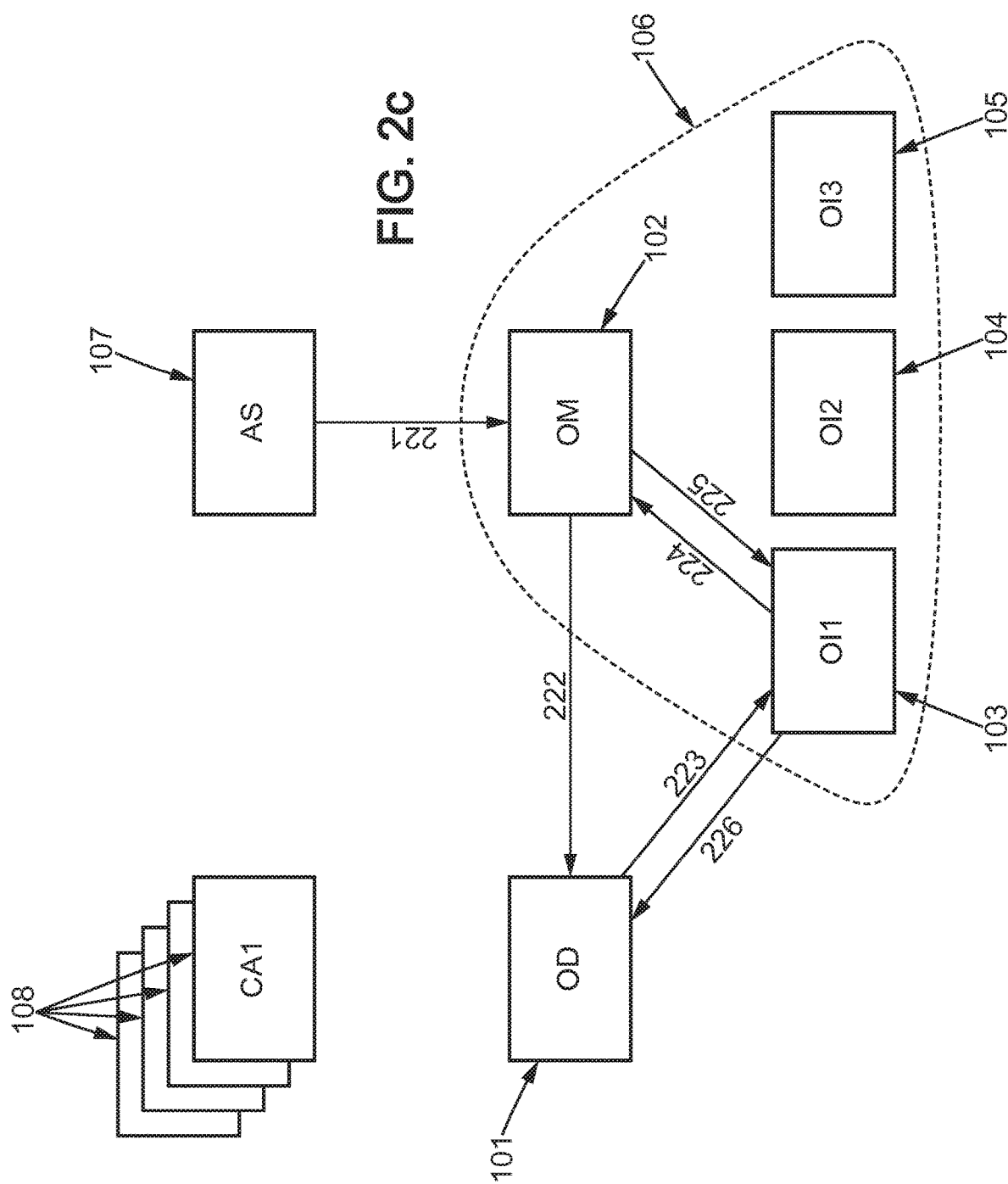

METHOD FOR AUTHORIZATION MANAGEMENT IN A COMMUNITY OF CONNECTED OBJECTS

The invention relates to the field of authorization management, particularly for connected objects.

The Internet of Things (or IoT) is a technological trend which aims to connect a large number of everyday objects via the Internet in order to provide services.

These objects may be objects in a home environment (hot water heater, refrigerator, door, lamp, alarm, car . . . ), in a work environment, or linked to specific business sectors (health and medicine, leisure and sports, factory and production tools, smart cities, energy and transport, etc.).

These objects are usually called "connected objects" or "smart objects". They may be physical objects (such as a watch), but may be virtual resources as well (such as an email account).

The interconnection and collaboration of these objects make it possible to offer advanced services. It is advantageous for this collaboration to occur as directly as possible between the objects, in other words without going through a centralized intelligence that knows about all objects in a domain, which is not practicable when preserving the diversity of objects, suppliers, and use cases.

For the objects to interconnect easily and to collaborate, the issue of access control (or authorization management) becomes essential.

Many architectures have previously been proposed:
- a pairing of objects by a human user, who manually configures each object to interact with another. This model is often too complex for the user to use, because he has to interact with all connected objects in his environment (for example his house), these objects having different and possibly complex configuration interfaces.
- controlling access by an Access Control List (ACL), where a user indicates to each object (directly or via a centralized server) the list of objects that can connect to it. This model raises scalability issues when the number of objects increases.
- a role-based access control (RBAC), where each object is configured to accept or not the connection of another object according to the role assigned to the other object. Here too the issue of scalability arises, as well as of the dynamic management of role reconfiguration according to the context.
- an identity-based access control (IBAC), where each object will accept or not the connection with other objects according to their identity. Either that identity is intrinsically linked to the object (for example MAC address) and the model is similar to ACL, or that identity is provided by a trusted third party (Identity Provider) and the model is then highly centralized.
- an attribute-based access control (ABAC), where each object is authorized or not authorized to connect to another object based on its attributes. Although this model allows specifying general rules which when combined will give different results depending on the specific context of their invocation, this model is nevertheless implemented either centrally (with the disadvantages described above) or in a completely decentralized manner (leading to other disadvantages in terms of scalability and configuration complexity).
- a capability-based access control (CapBAC), where each object will accept or not the connection with other objects according to their capability. The capability is a unique key (or token) associated only with a requesting object, authorizing it to perform certain actions on the requested object. This token is typically issued by a centralized entity in a complex manner where the actions authorized by the token and the token validity period and other conditions must be specified manually using a specific interface for generating and sending this token.

There is therefore a need to provide an automated method for authorization management, which is scalable and simple to configure in a context of connected objects.

The present invention aims to improve the situation.

The present invention therefore provides a method for authorization management in a community of connected objects, a master object being determined in said community, the method comprising:
receipt, by the master object from a requesting object, of
a request to carry out an action concerning:
the community of connected objects or
an internal object of the community, the internal object being distinct from the master object;
receipt, by an authentication server that is distinct from the master object, of a list of certified attributes associated with the requesting object;
after the attribute list is verified by the authentication server and a capability of the requesting object is determined based on said list of attributes, receipt by the master object of an authentication token comprising said capability;
transfer of said authentication token by the master object to said requesting object.

A coherent set of connected objects is called a community. This community may be automatic (for example all objects related to music, all objects related to home security, etc.). The community may also be defined manually by the user. Membership in one community does not exclude membership in another different community. To be part of a community, it is often necessary to be authorized. In any event, a community as understood in the context of connected objects is a set of objects whose list is defined, this list being stored for example in a local database or distributed (i.e. it is not simply a conceptual set of objects). Most of the time, the objects in a community have a special trust relationship.

The request to carry out an action concerning the community of connected objects may in particular be the act of joining the community.

The request to carry out an action concerning an internal object of the community may in particular be the act of interacting with this internal object or accessing one of the services it offers.

A characteristic associated with the object is called an "attribute". This characteristic is often intrinsic to the object or to its location (for example telephone number, GPS location of the object, terminal type, etc.). Attributes should not be confused with simple identifiers or roles assigned to the object (see above).

A "certified attribute" is an attribute whose accuracy has been certified by a trusted third party, usually called a certification authority. The certification usually consists of affixing a digital signature (for example an asymmetrical cryptographic signature).

The "capability" of an object is a set of authorizations (possibly only one) describing the various actions/rights that this object has in a given context. For example, a given capability may authorize an object:

to play music on a predetermined radio between 7 a.m. and 8 p.m. each day, or to open a connected door for 10 minutes starting from the assignment of this capability.

Most often, this capability takes the form of a "token", describing the various actions/rights in byte form. This token is usually signed by a trusted authority (for example an attribute management server or more generally an authentication server or AS).

To determine a capability or a set of capabilities from attributes, the authentication server can verify the certification of the attributes and, based on a set of rules, determine which capability should be allocated according to the attributes. These capabilities may be predefined from predetermined and associated rules.

The architecture proposed by the invention allows flexible rights management without excessive centralization. The authority that certified the attributes can thus be different from the authentication server. This allows a wide choice of certification authorities (or even the use of a plurality of certification authorities, each authority certifying a subset of the attribute list transmitted to the authentication server).

Furthermore, the invention proposes eliminating direct communications between the authentication server and the requesting object, for security reasons. Indeed, it can be useful if a requesting object with third party access does not have the ability to discover the address of the authentication server by conventional network discovery mechanisms.

The method may further comprise:
receipt of said authentication token by the master object;
verification by the master object that the authentication token authorizes said action;
transmission of a message authorizing said action if the verification is successful.

This new receipt may occur after the transfer of said authentication token by the abovementioned master object.

Thus, instead of interacting directly with the internal object, the requesting object must address the master object. This is particularly useful if the internal object does not have the cryptographic capability of verifying said authentication token containing the capability (for example the internal object is a low power open-door sensor with no dedicated and/or powerful processor).

Authorization verification within the community is then delegated to the master object.

The "transmission of a message authorizing said action if the verification is successful" may be a message sent directly to the internal object (i.e. thus activating the service) or may be a message sent to the requesting object specifying a secret or a temporary/permanent authorization code. This secret authorization code may be used (in one particular embodiment) solely for accessing the internal object requested by the requester, directly without intervention by the master object.

In addition, the request to carry out an action may concern the act of joining the community, and the transmission of said message authorizing said action may include a transmission by the master object of a community token relating to that community.

This community token may allow authorizing the requesting object to join the community.

In addition, the method may further comprise:
upon receipt of said community token by the master object, updating a database stored in the master object in order to add a new member to said community.

This updating may also involve updating a database of attributes that lists the attributes of the objects of the community.

The community token may authorize the requester to access the internal objects that are public in the community. Some internal objects of the community may also be private: it may then be necessary to specify a secret or a temporary/permanent authorization code.

In another embodiment, the request to carry out an action may concern the act of communicating with an internal object of the community that is distinct from the master object, and the transmission of said message authorizing said action may comprise a transmission by the master object of an object token relating to said internal object.

The receipt of the request may come directly from the requesting object.

Specifically, the transmission of said message authorizing said action may further comprise an address of the internal object.

Thus, the requesting object can communicate directly with the internal object after receiving authorization to interact with it.

This is particularly useful if the internal object is private in the community.

The receipt of the list of certified attributes may take place via the master object.

Communications between the authentication server and the certification authorities can thus be reduced.

In one embodiment, the receipt of the list of certified attributes may take place via at least one certification server, said certification server having certified at least one attribute of the list of attributes.

Moreover, the method may further comprise:
negotiation between the requesting object and the authentication server in order to define at least one certification server able to certify at least one attribute of the list of attributes.

This negotiation may take place via the master object.

The method may further comprise:
the requesting object sending a request for certification of at least one attribute, to a certification server.

The invention also relates to a system for authorization management in a community of connected objects, said system comprising
a master object in said community;
a requesting object;
an authentication server that is distinct from the master object;
wherein the requesting object comprises:
an interface for issuing a request to carry out an action concerning:
the community of connected objects or
an internal object of the community, the internal object being distinct from the master object;
wherein the master object comprises:
an interface for receiving said request
a circuit for transferring an authentication token originating from the authentication server, to said requesting object
wherein the authentication server comprises:
an interface for receiving a list of certified attributes associated with the requesting object
a circuit for verifying the list of attributes and for determining a capability of the requesting object based on said list of attributes,
an interface for sending said authentication token comprising said capability to the master object.

The invention also relates to a device able to be connected and to be part of a community of connected objects. The device comprises:
- an interface for receiving a message from a requesting object;
- a processor adapted for:
  - determining whether said received message comprises an authentication token comprising a capability authorizing an action relating to said device;
  - if this determination is positive, transmitting said message to a master object of said community, said master object being able to verify the validity of the authentication token,
- an interface for receiving a response message from said master object.

The processor is further adapted for:
- executing said action relating to said device if said response message comprises an indication that validates said authentication token;
- transmitting a result of the action to the requesting object.

The invention also provides a method for executing an action relating to a device, said device being connected and being part of a community of connected objects, wherein the method comprises:
- receiving a message from a requesting object;
- determining whether said received message comprises an authentication token comprising a capability authorizing the action relating to said device;
- if this determination is positive, transmitting said message to a master object of said community, said master object being able to verify the validity of said authentication token;
- receiving a response message from said master object;
- executing said action relating to said device if the response message comprises an indication that validates said authentication token;
- transmitting a result of the action to the requesting object.

The invention also relates to a device able to be connected, wherein the device comprises:
- an interface for receiving a first message from a master object of a community of connected objects, said first message containing an authentication token comprising a capability of said device that is determined based on a list of certified attributes;
- an interface for sending a second message to an object of said community, said message containing said token and a request to carry out an action, said action being:
  - a request to join said community or
  - a request to access a service offered by an internal object of said community, the internal object being distinct from the master object;
- an interface for receiving a third message authorizing said action or indicating a result of said action.

The invention also provides a method for executing an action, wherein the method comprises the following steps implemented by a requesting object:
- receiving a first message from a master object of a community of connected objects, said first message containing an authentication token comprising a capability of said requesting object that is determined based on a list of certified attributes;
- sending a second message to an object of said community, said message containing said token and a request to carry out an action, said action being:
  - a request to join said community or
  - a request to access a service offered by an internal object of said community, the internal object being distinct from the master object;
- receiving a third message authorizing said action or indicating a result of said action.

Figure 1C:
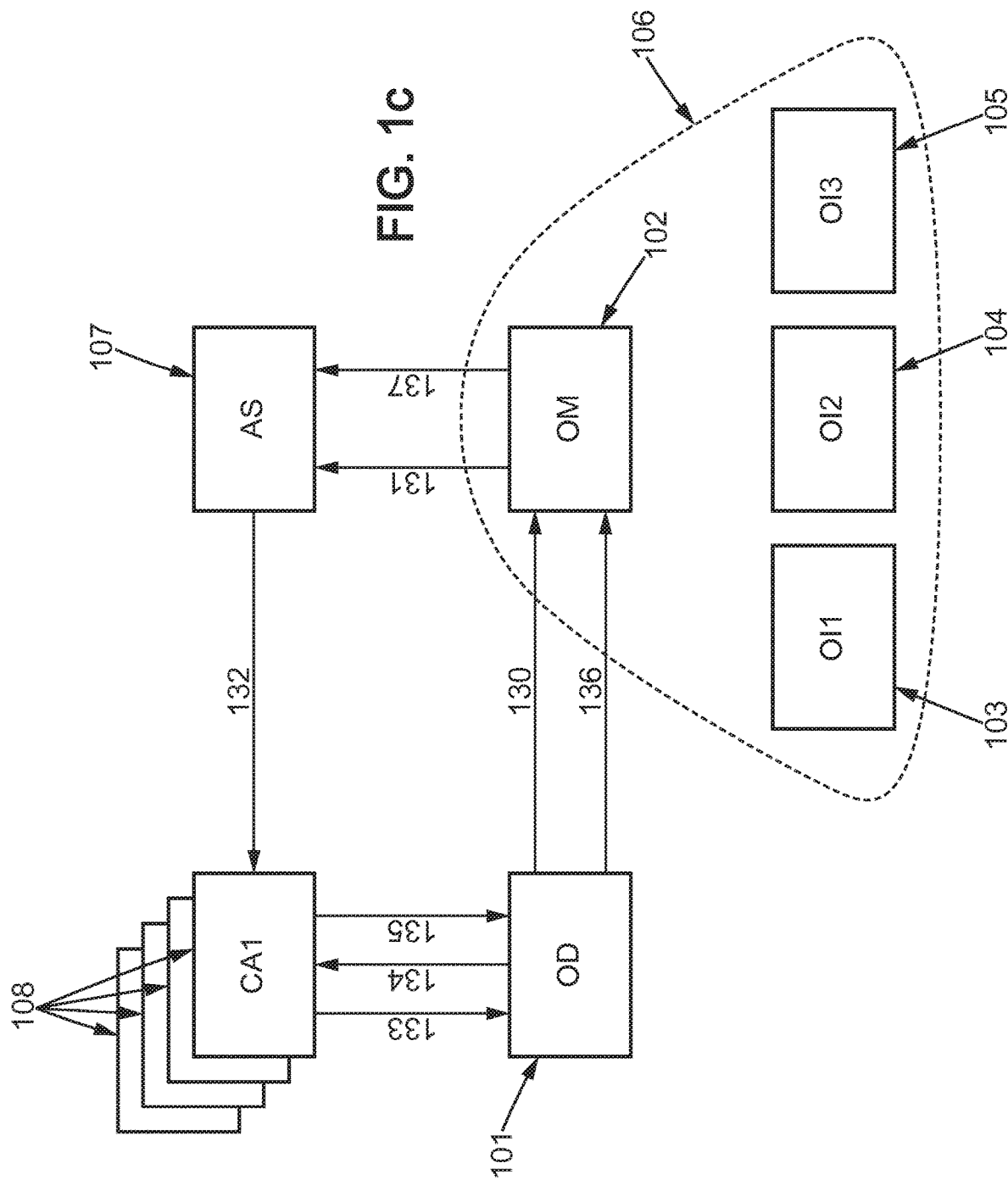
Figure 2B:
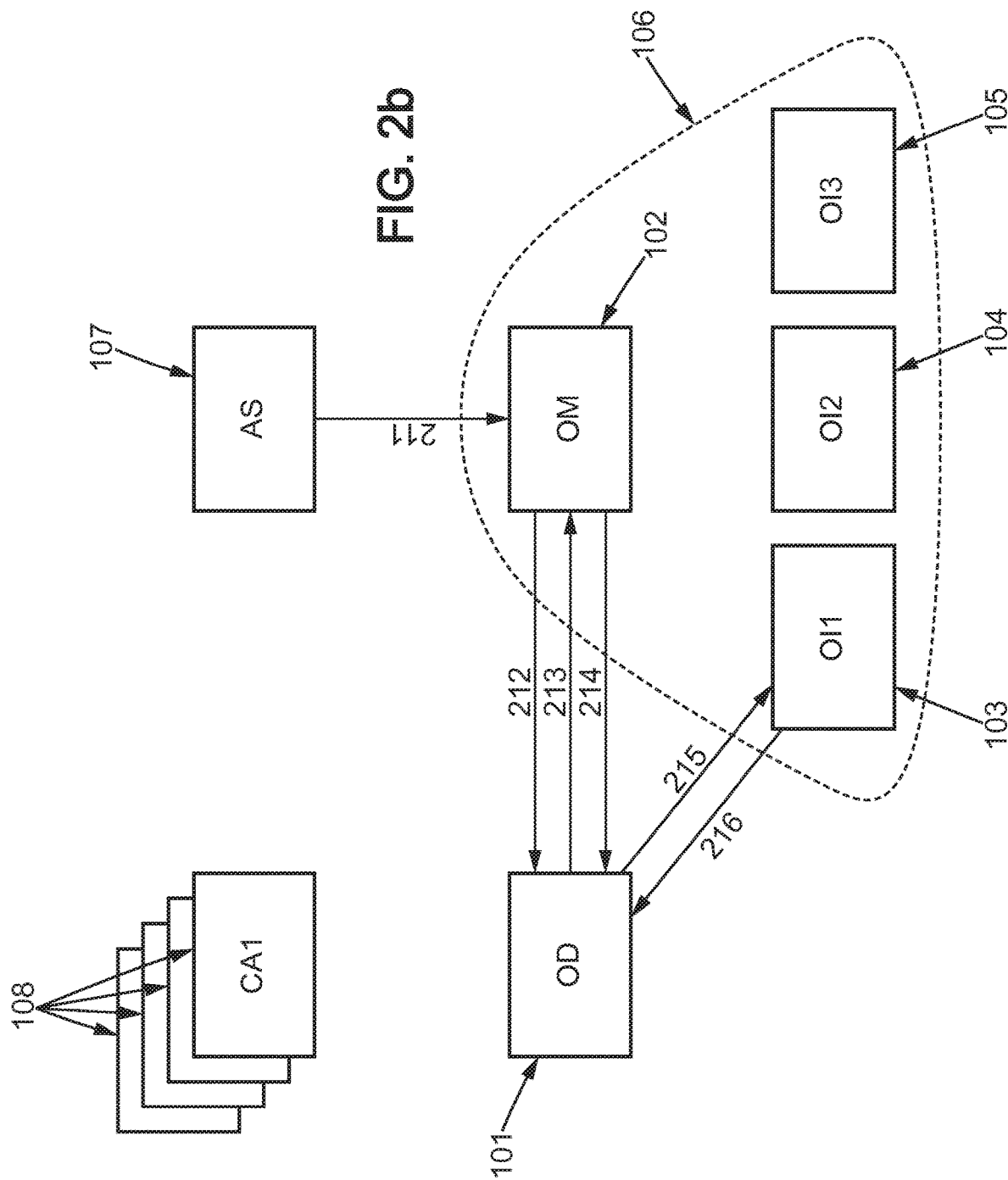

Other features and advantages of the invention will be further apparent from reading the following description. This is purely illustrative and is to be read with reference to the accompanying drawings, in which:

FIGS. 1a, 1b, and 1c illustrate three embodiments of the determination of a capability of a connected object;

FIGS. 2a, 2b, and 2c illustrate three embodiments for using the capability of a connected object.

FIG. 1a illustrates a first embodiment of the determination of a capability of a connected object. In this embodiment, a requesting object 101 wants to interact with:
- a community 106 of connected objects (103, 104, 105) or
- an internal object of the community 106.

The interaction of the requesting object with the community typically concerns the requesting object asking to join the community so formed.

The interaction of the requesting object with another internal object of the community typically concerns requesting content from the internal object (for example retrieving a status) or accessing a service provided by this internal object (for example diffusing music, requesting the opening of a door, etc.).

At this stage, and in particular in the case where the requesting object asks to interact with an internal object of the community, the requesting object may be external or internal to the community.

When the requesting object wishes to initiate this interaction, it sends a request 110 to a "master" object among the community objects 106. The master object was previously defined either by a user or automatically (for example randomly, based on availability, based on computing power, etc.).

If the requesting object does not know the master object of the community, it can broadcast a request in order to obtain it, or contact a random member of the community it already knows in order to obtain the information. This request is not represented here.

In one particular embodiment, multiple master objects may be defined per community in order to distribute the network/calculation load.

Once the request 110 is received by the master object 102, the latter can transfer (message 111) the request to an authentication server 107. The authentication server 107 is usually located on the Internet, and can be shared between multiple communities. There is therefore no reason, generally speaking, for the authentication server to be formally a part of the community 106.

Once the message is received 111, the authentication server can provide a list of certification authorities that it accepts or which are recognized (message 112) to the master object 102. The master object then transfers (message 113) this message to the requesting object.

The requesting object can thus choose from this list of certification authorities a corresponding authority or one with which it is already in contact. This choice is expressed by sending the message 114 containing the selected certification authority to the master object.

The master object transfers this choice (message 115) to the authentication server.

The messages 111 to 115 (describing the negotiation of the certification authority) are optional here and may also be used in other embodiments, including those described in FIGS. 1b and 1c.

Of course, the negotiation of the certification authority between the requesting object and the authentication server can be done directly without going through the master object. Although this choice of implementation avoids overloading the master object, it does not allow hiding the identity of the authentication server.

In one embodiment, this choice may be made directly in the message 110, the requesting object immediately proposing a certification authority without prior negotiation—if the proposal is acceptable, the negotiation 112, 113, 114, 115 may not take place.

Of course, the choice of certification authority may consist of choosing from a plurality of certification authorities 108 (for example the authentication server may select from this plurality, or the authentication server may contact each authority in this plurality in order to certify several different attributes).

Based on the knowledge of the chosen certification authority, the authentication server can send a certification request (message 116) to said certification authority 108 asking it to certify an attribute (the latter may or may not be indicated—in other words indicated in the certification request message or left unspecified, the appropriate attribute then being selected by the certification authority) concerning the requesting object. For example, this attribute may be a telephone number, a home address, the GPS position of the requesting object, etc.

Of course, if the authentication server wants the certification of multiple attributes, it is possible to contact several different certification authorities (or a single certification authority if it can do so).

The certification authority (or authorities if appropriate) can then contact the requesting object (message 117) in order to retrieve the attribute to be certified (message 118). This is useful if the attribute can change over time. If the attribute is static and the certification authority already knows it, messages 117 and 118 become optional.

Once the attribute is certified, the certification authority can return the certified attribute (or certified attributes if appropriate) to the authentication server (message 119).

Based on the received attribute (or received list of attributes), the authentication server can determine what the capability (or capabilities) of the requesting object is/are (i.e. the action or actions authorized for the requesting object) by comparing the attribute or list of attributes with a database of security rules (for example the database may contain "authorize opening the garage door by objects having as attributes the telephone number 06xxxxxxxx and a GPS position within a radius of 300 m of the house"). In this example, the requesting object will have the capability of authorizing opening the garage door if the rule "the telephone number is 06xxxxxxxx and the GPS position is within a radius of 300 m of the house" is satisfied.

The capabilities and rules for a given community may be stored in advance. The capabilities may be linked to one or more objects of the community or even to all objects of the community.

The token containing the capability can thus take the form of the following data structure:

```
{
    "id": "7g3vfT__0q2x-7",
    "ii": 1415174237,
    "is": "issuer@TrustedSharing.orange.com",
    "su": "zNwS5FetB4rwzSKsWwSBAx=",
    "co": "coap://aaaa : : 7/" : [
        {
            "de": "coap://sensorgate.parking",
            "si": "SbUudG4zuXswFBxDeHB87N6t9h1=",
            "ar": [
                {
                    "ac": "PUT",
                    "se": "door",
                    "c":
                }
            ]
            "de": "coap://sensorlight.floor1.Bob",
            "si": "SbUudG4zuXswFBxDeHB87N6t9h=",
            "ar": [
                {
                    "ac": "GET",
                    "re": "temperature",
                    "c":
                }
            ]
        }
    ]
    "nb": 1415174237,
    "na": 1415175381
}
``` with the following variables:
  id: the identifier of the capability token
  ii: the token issue date (for example the number of seconds since Jan. 1, 1970)
  is: the identification of the person who signed the token
  nb: the minimum token usage date (for example the number of seconds since Jan. 1, 1970)
  na: the maximum token usage date (for example the number of seconds since Jan. 1, 1970)
  de: the identifier of the internal object concerned by the capability
  co: the name of the community
  si: the token signature
  ar: the rights associated with the capability
  ac: the description of the authorized action (for example GET, POST, PUT, DELETE)
  se: the service provided by the internal object
  c: a set of conditions corresponding to the action (for example play music only if no music is currently being played), FIG. 1b illustrates a second embodiment of the determination of a capability of a connected object.

In this embodiment, the exchanges between the authentication server and the certification authorities are limited. However, the spirit of the invention remains the same.

First, the requesting object contacts a certification authority 108 (message 121) in order to send it an attribute or a plurality of attributes to be certified. Of course, and as above, a plurality of certification authorities can be used.

The certification authority signs the attribute and returns it to the requesting object 101 (message 122).

Then the requesting object can send its request for interaction (message 123—corresponding to message 101 in the previous embodiment) to the master object, accompanied by the certified attribute.

This request is then transferred (message 124) to the authentication server 107. Of course, the authentication server has a trust relationship with the certification authority that certified the transmitted attribute (for example it has the public key of the certification authority): the authentication server can thus verify that the attribute has indeed been signed by the certification authority indicated in the message 124. If no trust relationship exists between the certification authority and the authentication server, the authentication server

- may refuse the transaction and ask the requesting object to change the certification authority,
- may ask the certification authority to authenticate itself and/or to provide its public key in a secure manner (for example via a key management system known in the field of encryption/asymmetric signature).

Of course, if the requesting object has already requested a certification authority to sign/certify one of its attributes (and this has not changed/the certification is still valid), there is no need to exchange messages 121 and 122.

FIG. 1c shows a third embodiment of the determination of a capability of a connected object.

In this embodiment, message 130 (respectively 131) is identical/similar to message 110 (respectively 111).

Once the request is received by the authentication server, the latter may ask (message 132) a certification authority 108 to certify an attribute associated with the requesting object (the certification authority in question may have been previously negotiated or proposed in message 131).

Thus, the certification authority 108 communicates (message 133) with the requesting object in order for the latter to send (message 134) the attribute to be certified.

Once certified, the attribute is sent (message 135) to the requesting object.

The certified attribute can then be transferred to the authentication server via the master object 102 (messages 136 and 137).

In the same manner as in the previous embodiments, the authentication server can then verify the signature of the attribute (i.e. that it has proper certification) and determine the appropriate capability of the requesting object, in other words the action or actions it is authorized to perform.

FIG. 2a illustrates a first embodiment for using the capability of a connected object.

After the list of attributes is verified by the authentication server 107 and the capability of the requesting object is determined (see description relating to FIGS. 1a to 1c) according to said list of attributes, the authentication server sends an authentication token to the master object (message 201) and the master object sends it on to the requesting object (message 202). This token is signed by the authentication server.

Of course, messages 201 and 202 can be replaced by a single message between the authentication server and the requesting object.

Once received, the requesting object can communicate (message 203) with the master object to request access to a service offered by a given internal object (for example object 103) or to request to join the community 106, attaching the signed token to the message 203.

The master object then can verify that the token is valid and does indeed grant the rights to carry out the requested action (for example verification of the cryptographic/asymmetric signature). If the token is not valid or does not authorize carrying out the requested action, the master object can send an error message to the requesting object (not shown here).

If the request in the message 203 concerns joining the community 106, the master object may update an internal database containing a list of objects in the community in order to add the requesting object as a new member of the community. In addition, it is possible to update a database (the same as before or a different database) to indicate the attributes of the new member, for future use. The exchange of messages may stop at this point.

If the request concerns accessing a service of an internal object of the community, the master object may transfer the request to said internal object 103 (message 204) which then responds (message 205) because the master object is recognized. This response is transferred (message 206) to the requesting object.

A capability which authorizes joining a community may be comprised in a token called a "community" token.

A capability which authorizes interacting with an internal object may be comprised in a token called an "object" token.

FIG. 2b illustrates a second embodiment for using the capability of a connected object.

In this embodiment, message 211 (respectively 212, 213) is identical/similar to message 201 (respectively 202, 203).

Once message 213 is received, the master object can verify that the capability is valid and does indeed grant the indicated rights. If the capability is not valid or does not authorize carrying out the requested action, the master object may send an error message to the requesting object (not shown here).

Once the capability is verified, the master object may indicate to the requesting object the address of the internal object 103 which is the subject of a request for interaction. This address may be accompanied, for example, by a password (for example temporary) or by an authentication token (for example a certificate) which authorizes activating the service at the internal object.

The requesting object can thus connect (message 215) to the internal object 103 by using the password or the authentication token and can thus obtain the requested information (message 216).

FIG. 2c illustrates a third embodiment for using the capability of a connected object.

In this embodiment, message 221 (respectively 222) is identical/similar to message 201 (respectively 202).

In this embodiment, the requesting object connects directly (message 223) to the internal object 103, as it wishes to interact with the service of the internal object. In message 223, the requesting object attaches the object token (describing its capability transmitted in message 222).

Not having the technical capacity or computing capacity, or simply not wanting to verify this object token/this capability, the internal object can ask the master object to do the verification for it (message 224). Once verified, the result of this verification is sent to the internal object (message 225), which then decides whether the requested interaction is to be carried out (message 226).

Of course, the present invention is not limited to the embodiments described above as examples; it extends to other variants.

Other implementations are possible.

The invention claimed is:

1. Method for authorization management in a community of connected objects, a master object being determined in said community, the method comprising:
receipt, by the master object from a requesting object, of a request to carry out an action concerning:
the community of connected objects, or
an internal object of the community, the internal object being distinct from the master object;

receipt, by an authentication server that is distinct from the master object, of a list of certified attributes associated with the requesting object, an attribute being a characteristic linked to the requesting object, this characteristic being intrinsic to the requesting object;

after the list of attributes is verified by the authentication server and a capability of the requesting object is determined based on said list of attributes, a capability being a set of authorizations describing the various actions or rights that the requesting object has, receipt by the master object of an authentication token comprising said capability;

transfer of said authentication token to said requesting object by the master object;

receipt of said authentication token by the master object;

verification by the master object that the authentication token authorizes said action;

transmission of a message authorizing said action if the verification is successful, wherein the request to carry out an action concerns the act of joining the community, and wherein the transmission of said message authorizing said action includes a transmission by the master object of a community token relating to said community; and upon receipt of said community token by the master object, updating a database stored in the master object in order to add a new member to said community.

2. Method according to claim 1, wherein the request to carry out an action concerns the act of communicating with an internal object of the community that is distinct from the master object, and wherein the transmission of said message authorizing said action comprises a transmission by the master object of an object token relating to said internal object.

3. Method according to claim 1, wherein the receipt of the request comes directly from the requesting object.

4. Method according to claim 2, wherein the transmission of said message authorizing said action further comprises an address of the internal object.

5. Method according to claim 1, wherein the receipt of the list of certified attributes takes place via the master object.

6. Method according to claim 1, wherein the receipt of the list of certified attributes takes place via at least one certification server, said certification server having certified at least one attribute of the list of attributes.

7. Method according to claim 1, wherein the method further comprises:
negotiation between the requesting object and the authentication server in order to define at least one certification server able to certify at least one attribute of the list of attributes.

8. Method according to claim 1, wherein the method further comprises:
the requesting object sending a request for certification of at least one attribute, to a certification server.

9. Device able to be connected and to be part of a community of connected objects, wherein the device comprises:
an interface for receiving a message from a requesting object;
a processor adapted for:
determining whether said received message comprises an authentication token comprising a capability authorizing an action relating to said device, the capability being a set of authorizations describing the various actions or rights that the requesting object has;
if this determination is positive, transmitting said message to a master object of said community, said master object being able to verifying the validity of the authentication token, wherein a request to carry out the action concerns the act of joining the community, and wherein the transmission of said message authorizing said action includes a transmission by the master object of a community token relating to said community;
an interface for receiving a response message from said master object;
the processor being further adapted for:
executing said action relating to said device if said response message comprises an indication that validates said authentication token;
transmitting a result of the action to the requesting object; and
upon receipt of said community token by the master object, updating a database stored in the master object in order to add a new member to said community.

10. Method for executing an action relating to a device, said device being connected and being part of a community of connected objects, wherein the method comprises:
receiving a message from a requesting object;
determining whether said received message comprises an authentication token comprising a capability authorizing the action relating to said device, the capability being a set of authorizations describing the various actions or rights that the requesting object has;
if this determination is positive, transmitting said message to a master object of said community, said master object being able to verifying the validity of the authentication token;
receiving a response message from said master object;
executing said action relating to said device if the response message comprises an indication that validates said authentication token, wherein a request to carry out the action concerns the act of joining the community, and wherein the transmission of said message authorizing said action includes a transmission by the master object of a community token relating to said community;
transmitting a result of the action to the requesting object; and
upon receipt of said community token by the master object, updating a database stored in the master object in order to add a new member to said community.

11. Device able to be connected, wherein the device comprises:
an interface for receiving a first message from a master object of a community of connected objects, said first message containing an authentication token comprising a capability of said device that is determined based on a list of certified attributes, an attribute being a characteristic linked to the requesting object, this characteristic being intrinsic to the requesting object, the capability being a set of authorizations describing the various actions or rights that the requesting object has;
an interface for sending a second message to an object of said community, said second message containing said authentication token and a request to carry out an action, said action being:
a request to join said community or
a request to access a service offered by an internal object of said community, the internal object being distinct from the master object wherein a request to carry out the action concerns the act of joining the community;

an interface for receiving a third message authorizing said action or indicating a result of said action, wherein transmission of the third message authorizing said action includes a transmission by the master object of a community token relating to said community; and upon receipt of said community token by the master object, updating a database stored in the master object in order to add a new member to said community.

12. Method for executing an action, wherein the method comprises the following steps implemented by a requesting object:

receiving a first message from a master object of a community of connected objects, said first message containing an authentication token comprising a capability of said requesting object that is determined based on a list of certified attributes, an attribute being a characteristic linked to the requesting object, this characteristic being intrinsic to the requesting object, the capability being a set of authorizations describing the various actions or rights that the requesting object has;

sending a second message to an object of said community, said second message containing said authentication token and a request to carry out an action, said action being:

a request to join said community or a request to access a service offered by an internal object of said community, the internal object being distinct from the master object wherein a request to carry out the action concerns the act of joining the community;

receiving a third message authorizing said action or indicating a result of said action, wherein transmission of the third message authorizing said action includes a transmission by the master object of a community token relating to said community; and upon receipt of said community token by the master object, updating a database stored in the master object in order to add a new member to said community.

13. Method according to claim 3, wherein the transmission of said message authorizing said action further comprises an address of the internal object.

* * * * *